Aug. 19, 1958 W. R. LONDGREN 2,847,974
CATTLE CHUTE STANCHIONS
Filed Oct. 1, 1957 2 Sheets-Sheet 1
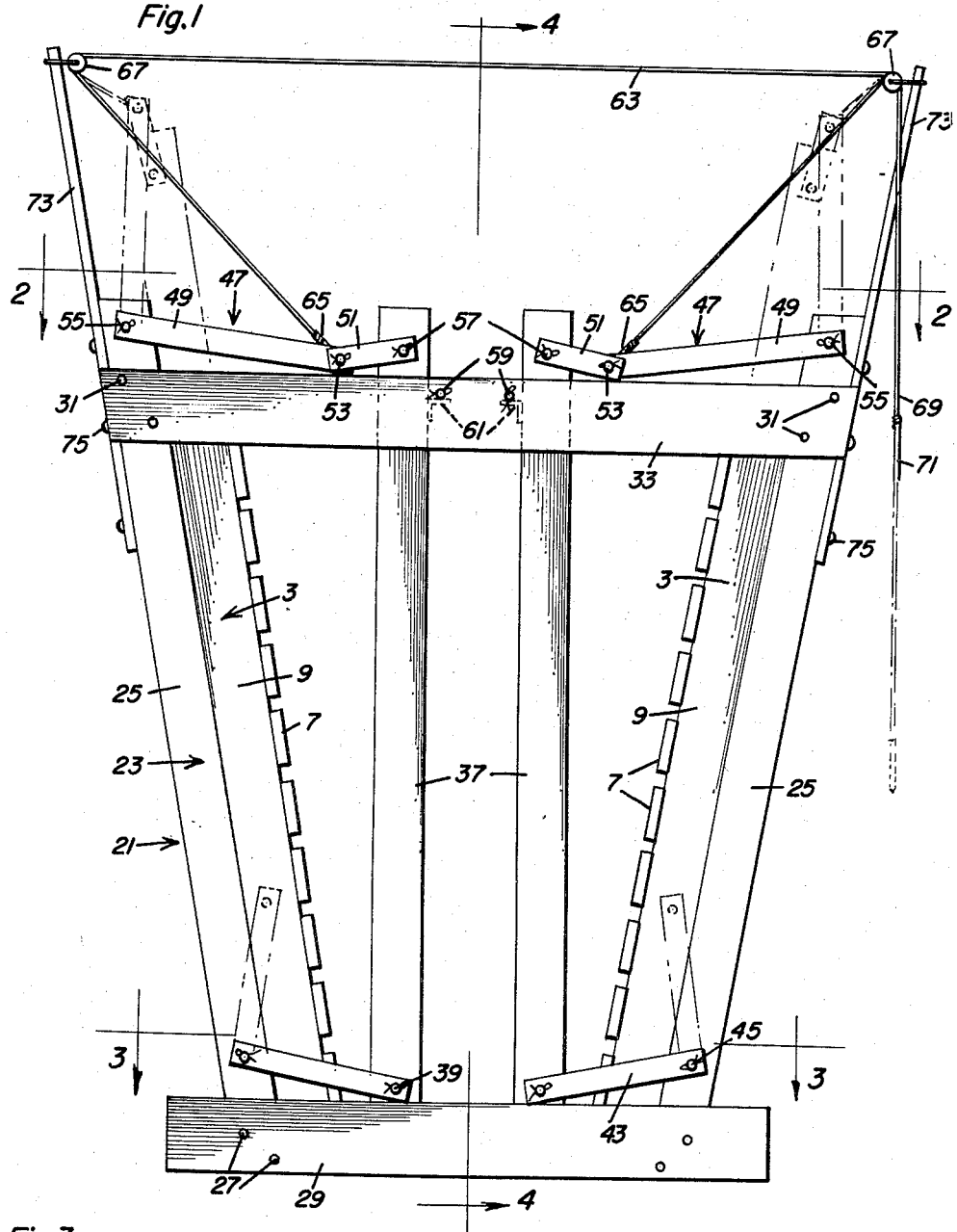
Fig.1
Fig.3
Walter R. Londgren
INVENTOR.
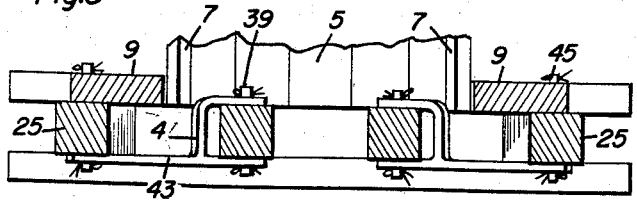

Aug. 19, 1958  W. R. LONDGREN  2,847,974
CATTLE CHUTE STANCHIONS
Filed Oct. 1, 1957  2 Sheets-Sheet 2
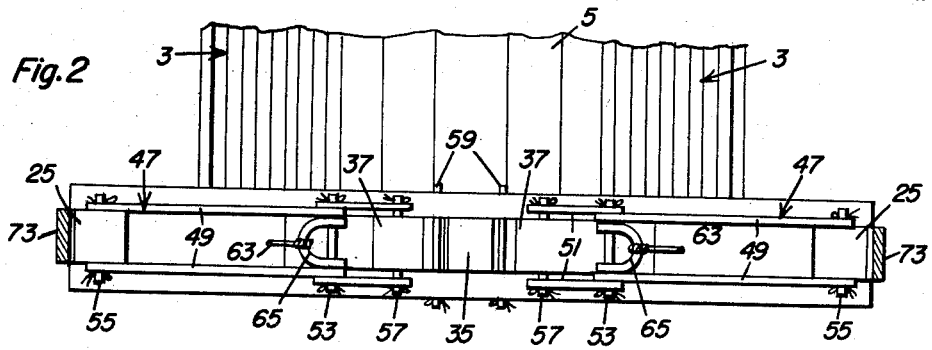
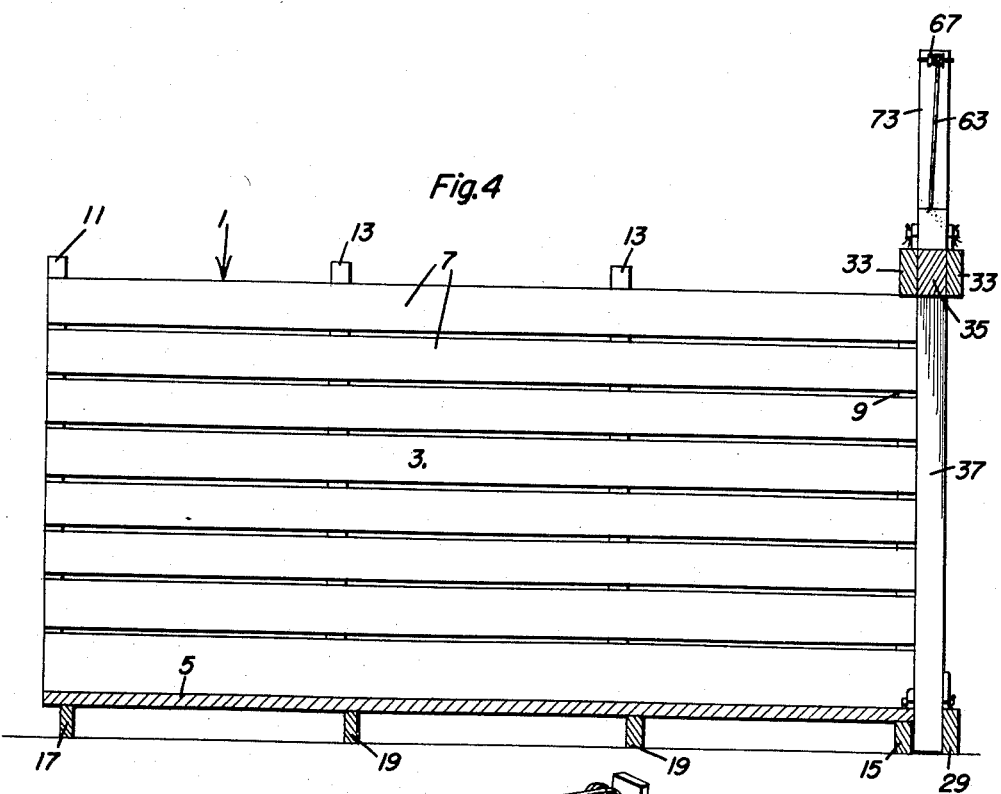
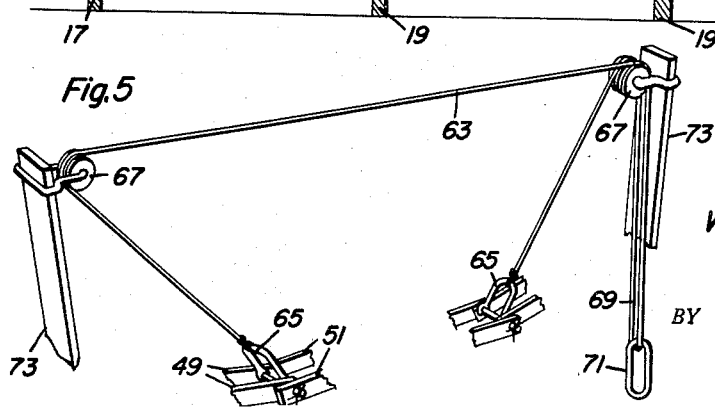
Walter R. Londgren
INVENTOR.

United States Patent Office 2,847,974
Patented Aug. 19, 1958

2,847,974

CATTLE CHUTE STANCHIONS

Walter R. Londgren, Hollandale, Wis.

Application October 1, 1957, Serial No. 687,492

1 Claim. (Cl. 119—99)

My invention relates to improvements in stanchions for the front end of a cattle chute for holding an animal in the chute by its neck for branding, dehorning and other treatments.

The primary object of my invention is to provide in a cattle chute having upwardly diverging sides a pair of upright neck yoke bars mounted for gravity movement downwardly and laterally toward each other into spaced parallel position to close against opposite sides of an animal's neck for restraining the animal in the chute and which are movable laterally and upwardly into opening upwardly diverging releasing position in front of the chute sides vertically parallel therewith to dispose the bars in a position such that they will not interfere with escape of the animal out of the chute when released nor extend outwardly beyond the sides of the chute.

Another object is to provide linkage of simple form and inexpensive construction for mounting the neck yoke bars for closing and opening as above set forth and manipulative means for easily operating the linkage for opening movement of the yoke bars in unison.

Still another object is to provide locking means for holding the neck yoke bars down and closed and releasing the same in response to lateral movement of the neck yoke bars, whereby to obviate separately operative locking devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation of a cattle chute equipped with my improved stanchion in the preferred embodiment thereof;

Figure 2 is a fragmentary view in horizontal section taken on the line 2—2 of Figure 1;

Figure 3 is a fragmentary view in horizontal section taken on the line 3—3 of Figure 1;

Figure 4 is a view in vertical longitudinal section taken on the line 4—4 of Figure 1 and drawn to a smaller scale; and Figure 5 is a fragmentary perspective view illustrating the operating means for the linkage.

Referring to the drawings by numerals, the cattle chute to which my improved stanchion is shown applied, and which is designated generally by the numeral 1, and is conventional comprises a pair of sides 3 diverging upwardly from a floor 5. The sides 3 comprise longitudinal slat bars 7 suitably secured to the inner sides of front, rear, and intermediate pairs of uprights 9, 11, 13 respectively diverging upwardly in each pair from front, rear and intermediate transverse sill bars 15, 17, 19 to which said bars 9, 11, 13 are suitably secured and which support the floor 5.

My improved stanchion designated generally by the numeral 21 comprises a frame 23 at the front end of the chute 1 including a pair of side posts 25 preferably 4 x 4 timber in front of the uprights 9 of the chute 1 and which flare upwardly in correspondence with said uprights 9 and are offset outwardly therefor for a purpose presently seen and extend above the same.

The lower ends of the posts 25 are secured, as at 27, between the front sill bar 15 of the chute 1 and a parallel horizontal cross bar 29 opposite said bar 15 and which, together with the bar 15, form the bottom of the frame 23 level with the floor 5 and securing the frame 23 at its bottom to the chute 1. The posts 25 extend above the chute 1 and are secured below their upper ends as at 31, between a pair of upper horizontal opposite cross bars 33 both of which are suitably secured on the front pair of uprights 9 and forms with the other bar 33 the top of the frame 23 secured to the chute 1. A spacing block 35 is interposed and suitably secured between the bars 33 in the center thereof for a particular purpose presently seen.

A pair of upright neck yoke bars 37 are mounted between the pair of posts 25 coplanar therewith with their lower ends slidably fitted between the pair of bars 15, 29 and their upper ends extending above and slidably fitted between the pair of bars 33. The neck yoke bars 37 are slidable by gravity downwardly longitudinally and laterally toward each other into closing position perpendicular to the floor 5 and at opposite sides of the vertical center of the frame 21, or chute 1, as shown in full lines in Figure 1, and are longitudinally and laterally slidable upwardly into upwardly diverging relation and open position in which they seat laterally against the posts 25 flush therewith and in front of the sides 3 of the chute in an out of the way position, as shown in broken lines in Figure 1, relative to an animal, not shown, leaving the chute 1 by the front end of the chute.

For mounting the neck yoke bars 37 for operation as above set forth the lower ends of said bars 37 are pivoted by horizontal pivots 39 in forked ends 41 of a pair of links 43 extending oppositely outwardly from said bars 37 and having their other ends pivoted as at 45, to the lower portions of the posts 25 for vertical swinging above the bars 15, 29.

A pair of like, vertically swingable toggles 47 above the upper bars 33 extend outwardly oppositely from the neck yoke bars 37 and connect the upper ends of said neck yoke bars 37 to the upper ends of the posts 25.

The toggles 47 each comprise a pair of opposite laterally spaced toggle links 49 and a pair of similarly spaced shorter toggle links 51, the pairs being terminally pivoted together by a transverse pivot bolt 53, the links 49 being terminally pivoted by a pivot bolt 55 to opposite sides of the posts 25 and the links 51 being terminally pivoted by a pivot bolt 57 to opposite sides of the neck yoke bars 37.

As will be seen, and as best shown in Figure 1, the links 49 are longer than the links 43 and the links 51 are shorter than the links 43 and the pivots 53, 55, 57 of the toggle links 49, 51 are spaced apart so that the toggles 47 may break upwardly, at the pivots 53, and said toggles fold upwardly into vertical position, as shown in broken lines in Figure 1 to operate the neck yoke bars 37 into the previously described open position. Also the toggles 47 may straighten out to permit the neck yoke bars 37 to gravitate into the previously described closed position. As will also be seen in the straightened out position of the toggles 47, when said toggles are initially broken, the neck yoke bars 37 are initially swung on the pivots 39 outwardly laterally at their upper ends and when said bars 37 gravitate into closed position they swing on the pivots 39 so that their upper ends swing inwardly before said bars 37 are finally closed.

The locking means comprises a pair of transverse bolts 59 in the bars 33 at opposite sides of the spacing block 35 and a pair of transverse angle bars 61 on the neck yoke bars 37. The angle bars 61 are moved under the bolts 59 in response to final lateral movement of the neck yoke bars 37 into closed position to lock said bars against casual vertical movement and are moved from under said bolts 59 in response to initial lateral movement of the neck yoke bars toward opening position.

An operating pull cable 63 is terminally connected at one end by clevises 65 to the pivot bolts 53 and is trained upwardly over a pair of pulleys 67 at opposite sides of the frame 23 with a loop 69 having a hand-grip link 71 therein hanging pendent at one side of the chute 1. The pulleys 67 are suitably mounted on a pair of support bars 73 therefor rising from and bolted as at 75 to the posts 25.

To operate the described stanchion pull is exerted on the pull cable 63 manually by a hand grasping the link 71 whereby pull is exerted upwardly on the pivot bolts 53 to break the toggles 47 upwardly and fold the same upwardly into the broken line position shown in Figure 1. As the toggles 47 break upwardly initially the upper ends of the neck yoke bars 37 are swung outwardly laterally to unlock the same in the manner previously described and said bars 37 are then swung and lifted upwardly in a manner which will be clear to open said bars for insertion therebetween of the neck of an animal in the chute 1.

Before the animal is chased into the chute the pull cable 63 is released and the neck yoke bars gravitate into closed position in a manner which has been sufficiently described and are locked as previously described and as shown in Figure 1. This prevents the animal from walking on through the chute. In the closed position of the neck yoke bars 37 the toggles 47 at their pivots 53 rest on the bars 33 and the links 43 at their pivots 39 rest on the bars 29 whereby to support the neck yoke bars when closed.

To allow the animal to insert its head into the stanchion the bar at joint 53 is raised sufficiently to allow the top of neck yoke bar 37 to tilt back. The neck yoke bar 37 will tilt back about seven inches at top to allow the animal to insert its head. This can be done on both sides of stanchion if it is an animal with long horns. When animal's head is in stanchion, neck yoke bar is shoved to closed position and neck yoke automatically locks in place.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a cattle chute having upwardly flaring sides, a stanchion comprising a pair of laterally spaced horizontal bars at one end and the bottom of the chute, a pair of laterally spaced horizontal bars extending across the top of the chute, a pair of upright posts forwardly of said end of the chute spaced outwardly of said sides and flaring upwardly in correspondence with said sides and interposed between and fixed to the bars of said pairs, a pair of upright neck yoke bars interposed between the bars of said pairs and slidable vertically and laterally into closed parallel position and into open upwardly diverging relation and seated position against said posts, mounting means for said neck yoke bars comprising a pair of links adjacent and above the first mentioned pair of spaced bars terminally pivoted to said posts and to said neck yoke bars for vertical swinging in response to vertical and lateral swinging of the neck yoke bars, a pair of operating toggles for said neck yoke bars above the second mentioned bars terminally pivoted to said neck yoke bars and to said posts and jointed for upward breaking at the joints thereof and downward movement into straightened position to operate the neck yoke bars, and manual means for operating said toggles to break the same upwardly, said manual means comprising a pull cable terminally connected to the joints of said toggles, and pulleys on said posts over which said cable is trained.

References Cited in the file of this patent
UNITED STATES PATENTS

| | | |
|---|---|---|
| 1,323,072 | Kuhlman | Nov. 25, 1919 |
| 2,234,366 | Carter | Mar. 11, 1941 |